US008259617B2

United States Patent
Abraham et al.

(10) Patent No.: US 8,259,617 B2
(45) Date of Patent: Sep. 4, 2012

(54) METHOD AND SYSTEM FOR TIMELY DELIVERY OF MULTIMEDIA CONTENT VIA A FEMTOCELL

(75) Inventors: Charles Abraham, Los Gatos, CA (US); Xuemin Sherman Chen, Rancho Sante Fe, CA (US); Wael William Diab, San Francisco, CA (US); Vinko Erceg, Cardiff, CA (US); Victor T. Hou, La Jolla, CA (US); Jeyhan Karaoguz, Irvine, CA (US); Mark Kent, Vista, CA (US)

(73) Assignee: Broadcom Corporation, Irvine, CA (US)

( * ) Notice: Subject to any disclaimer, the term of this patent is extended or adjusted under 35 U.S.C. 154(b) by 189 days.

(21) Appl. No.: 12/406,835

(22) Filed: Mar. 18, 2009

(65) Prior Publication Data
US 2010/0238836 A1  Sep. 23, 2010

(51) Int. Cl.
*H04L 12/28* (2006.01)
*H04N 21/20* (2011.01)
*G06F 15/173* (2006.01)
*H04W 4/00* (2009.01)

(52) U.S. Cl. ........ 370/254; 370/338; 370/352; 348/180; 709/226; 455/422.1

(58) Field of Classification Search .......... 370/227–403; 348/180; 709/226; 455/422.1
See application file for complete search history.

(56) References Cited

U.S. PATENT DOCUMENTS

| | | | | |
|---|---|---|---|---|
| 6,134,223 A * | 10/2000 | Burke et al. | ................... | 370/265 |
| 6,240,066 B1 * | 5/2001 | Nagarajan et al. | ............ | 370/230 |
| 6,307,839 B1 * | 10/2001 | Gerszberg et al. | ............ | 370/235 |
| 6,850,533 B2 * | 2/2005 | Gerszberg et al. | ............ | 370/401 |
| 6,970,682 B2 * | 11/2005 | Crilly et al. | ...................... | 455/78 |
| 7,239,338 B2 * | 7/2007 | Krisbergh et al. | ......... | 348/14.01 |
| 7,302,269 B1 | 11/2007 | Crawford et al. | | |
| 7,680,154 B2 * | 3/2010 | Stanton et al. | ................ | 370/507 |
| 7,715,418 B2 * | 5/2010 | Cho et al. | ...................... | 370/412 |

(Continued)

FOREIGN PATENT DOCUMENTS
WO    WO 2005/021022    3/2005
(Continued)

OTHER PUBLICATIONS

Unpublished U.S. Appl. No. 12/391,009, filed Feb. 23, 2009.
(Continued)

*Primary Examiner* — Ayaz Sheikh
*Assistant Examiner* — Venkatesh Haliyur
(74) *Attorney, Agent, or Firm* — Sterne, Kessler, Goldstein & Fox P.L.L.C.

(57) ABSTRACT

Aspects of a method and system for timely delivery of multimedia content via a femtocell are provided. In this regard, a femtocell may receive data via an upstream path and transmit data via a downstream path. One of the upstream path and downstream path may comprise a cellular path and the other may comprise a non-cellular path. One or both of the upstream path and the downstream path may be audio video bridging (AVB) paths. Data may be stored in the femtocell based on timing characteristics of one or both of the upstream path and the downstream path. Data may be delivered to the femtocell utilizing best effort delivery and the data may be forwarded by the femtocell with guaranteed quality of service. Resources in the femtocell may be reserved and/or synchronized, utilizing AVB protocols, for communication of one or more data streams.

14 Claims, 5 Drawing Sheets

U.S. PATENT DOCUMENTS

| | | | |
|---|---|---|---|
| 7,830,152 B2* | 11/2010 | Diab | 324/533 |
| 7,864,794 B2* | 1/2011 | Diab et al. | 370/442 |
| 7,920,597 B2* | 4/2011 | Conway et al. | 370/503 |
| 8,077,617 B2* | 12/2011 | Teener | 370/232 |
| 2002/0039371 A1 | 4/2002 | Hedayat et al. | |
| 2004/0133689 A1* | 7/2004 | Vasisht | 709/228 |
| 2005/0197748 A1* | 9/2005 | Holst et al. | 701/3 |
| 2006/0209795 A1 | 9/2006 | Chow et al. | |
| 2007/0121655 A1 | 5/2007 | Jin | |
| 2007/0189184 A1 | 8/2007 | Ryu et al. | |
| 2007/0258446 A1* | 11/2007 | Smith et al. | 370/389 |
| 2007/0263554 A1* | 11/2007 | Finn | 370/256 |
| 2008/0037567 A1* | 2/2008 | Cho et al. | 370/401 |
| 2008/0096553 A1* | 4/2008 | Saksena et al. | 455/426.2 |
| 2008/0216145 A1 | 9/2008 | Barton et al. | |
| 2008/0261602 A1* | 10/2008 | Livneh | 455/442 |
| 2008/0285459 A1* | 11/2008 | Diab et al. | 370/238 |
| 2009/0042536 A1 | 2/2009 | Bernard et al. | |
| 2009/0049175 A1* | 2/2009 | Finn | 709/226 |
| 2009/0049937 A1* | 2/2009 | Diab | 73/866.1 |
| 2009/0061873 A1 | 3/2009 | Bao et al. | |
| 2009/0086691 A1* | 4/2009 | Balasubramanian | 370/338 |
| 2009/0092081 A1 | 4/2009 | Balasubramanian et al. | |
| 2009/0098858 A1 | 4/2009 | Gogic | |
| 2009/0098872 A1* | 4/2009 | Deshpande et al. | 455/435.2 |
| 2009/0141625 A1* | 6/2009 | Ghai et al. | 370/230 |
| 2009/0160943 A1* | 6/2009 | Badt et al. | 348/180 |
| 2009/0164547 A1 | 6/2009 | Ch'ng | |
| 2009/0279430 A1 | 11/2009 | Huber et al. | |
| 2009/0285225 A1* | 11/2009 | Dahod | 370/401 |
| 2009/0288144 A1 | 11/2009 | Huber et al. | |
| 2009/0292799 A1 | 11/2009 | Eisener et al. | |
| 2009/0316649 A1 | 12/2009 | Chen | |
| 2010/0056104 A1* | 3/2010 | Butler et al. | 455/410 |
| 2010/0070417 A1* | 3/2010 | Flynn et al. | 705/51 |
| 2010/0071038 A1* | 3/2010 | Flynn et al. | 726/5 |
| 2010/0099431 A1* | 4/2010 | Sampath et al. | 455/454 |
| 2010/0118895 A1* | 5/2010 | Radulescu | 370/503 |
| 2010/0120447 A1* | 5/2010 | Anderson et al. | 455/456.1 |
| 2010/0136943 A1* | 6/2010 | Hirvela et al. | 455/404.1 |
| 2010/0159883 A1* | 6/2010 | Pascal et al. | 455/412.1 |
| 2010/0165957 A1* | 7/2010 | Hegde et al. | 370/338 |
| 2010/0165960 A1* | 7/2010 | Richardson | 370/338 |
| 2010/0167734 A1 | 7/2010 | Jones et al. | |
| 2010/0172267 A1* | 7/2010 | Viorel et al. | 370/254 |
| 2010/0182991 A1* | 7/2010 | Abraham et al. | 370/349 |
| 2010/0184411 A1 | 7/2010 | Chen | |
| 2010/0184414 A1 | 7/2010 | Abraham et al. | |
| 2010/0184423 A1 | 7/2010 | Kent et al. | |
| 2010/0184450 A1 | 7/2010 | Chen et al. | |
| 2010/0186027 A1 | 7/2010 | Hou et al. | |
| 2010/0189096 A1* | 7/2010 | Flynn et al. | 370/352 |
| 2010/0189120 A1* | 7/2010 | Diab et al. | 370/401 |
| 2010/0190533 A1* | 7/2010 | Black et al. | 455/571 |
| 2010/0210239 A1 | 8/2010 | Karaoguz et al. | |
| 2010/0220642 A1 | 9/2010 | Abraham et al. | |
| 2010/0220692 A1* | 9/2010 | Diab et al. | 370/336 |
| 2010/0220731 A1 | 9/2010 | Diab et al. | |
| 2010/0222054 A1 | 9/2010 | Abraham et al. | |
| 2010/0222069 A1 | 9/2010 | Abraham et al. | |
| 2010/0238836 A1* | 9/2010 | Diab et al. | 370/254 |
| 2011/0002429 A1* | 1/2011 | Williams et al. | 375/356 |

FOREIGN PATENT DOCUMENTS

| | | |
|---|---|---|
| WO | 2007/000455 | 1/2007 |

OTHER PUBLICATIONS

Unpublished U.S. Appl. No. 12/395,470, filed Feb. 27, 2009.
Unpublished U.S. Appl. No. 12/395,410, filed Feb. 27, 2009.
Unpublished U.S. Appl. No. 12/395,383, filed Feb. 27, 2009.
Unpublished U.S. Appl. No. 12/395,313, filed Feb. 27, 2009.
Unpublished U.S. Appl. No. 12/395,436, filed Feb. 27, 2009.
European Search Report corresponding to European Patent Application No. 10001341.6-1244, dated Jul. 5, 2010.

* cited by examiner

METHOD AND SYSTEM FOR TIMELY DELIVERY OF MULTIMEDIA CONTENT VIA A FEMTOCELL

CROSS-REFERENCE TO RELATED APPLICATIONS/INCORPORATION BY REFERENCE

Not Applicable.

FIELD OF THE INVENTION

Certain embodiments of the invention relate to communications. More specifically, certain embodiments of the invention relate to a method and system for timely delivery of multimedia content via a femtocell.

BACKGROUND OF THE INVENTION

A femtocell may be placed in a customer's residence or in a small business environment, for example. Femtocells may be utilized for off-loading macro radio network facilities, improving coverage locally in a cost-effective manner, and/or implementing home-zone services to increase revenue. Femtocells, like macro base stations, may be enabled to connect "standard" phones to a cellular provider's network by a physical broadband connection which may be a digital subscriber line (DSL) connection and/or a cable connection, for example. Since the traffic between a customer's premises femtocell equipment and the operator's network may be traversing a public network, the traffic may be prone to various risks.

Communication between femtocells and one or more cellular provider's networks enables operation in private and public areas. The capacity of a femtocell may be adequate to address a typical family use model supporting two to four simultaneous voice calls and/or data, for example.

An important characteristic of femtocells is their ability to control access. In an open access scenario, any terminal and/or subscriber may be allowed to communicate with the femtocell. Accordingly, the femtocell usage may somewhat resemble that of a macrocellular system. In a closed access scenario, the femtocell may serve a limited number of terminals and/or subscribers that may be subscribed to a given cellular base station. In this regard, the cellular base station may be perceived as being deployed for private usage.

A regulatory issue with regard to femtocells is that they use licensed frequencies that radiate at a very low power in a controlled environment. It may be likely that they may not require a license from a local authority, as macrocellular base stations do. An additional regulatory issue may arise from the relationship between a femtocell operator and a broadband services operator. One possible scenario may include the broadband operator being unaware of the existence of a femtocell operator. Conversely, the broadband operator and femtocell operator may have an agreement or they may be the same operator, for example. Interference between femtocells may be an issue for femtocell deployments based on wideband technologies such as WCDMA, for example, because initial operator deployments may use the same frequency for both the femtocell and the macrocellular networks or due to the proximity of femtocell base stations in dense urban areas.

There are a plurality of design models for deployment and integration of femtocells, for example, an IP based Iu-b interface, a session initiation protocol (SIP) based approach using an Iu/A interface, use of unlicensed spectrum in a technique known as unlicensed mobile access (UMA) and/or use of IP multimedia subsystem (IMS) voice call continuity (VCC), for example.

In an Iu-b model based femtocell deployment approach, femtocells may be fully integrated into the wireless carrier's network and may be treated like any other remote node in a network. The Iu-b protocol may have a plurality of responsibilities, such as the management of common channels, common resources, and radio links along with configuration management, including cell configuration management, measurement handling and control, time division duplex (TDD) synchronization, and/or error reporting, for example. In Iu-b configurations, mobile devices may access the network and its services via the Node B link, and femtocells may be treated as traditional base stations.

In a SIP based femtocell deployment approach, a SIP client, embedded in the femtocell may be enabled to utilize SIP to communicate with the SIP-enabled mobile switching center (MSC). The MSC may perform the operational translation between the IP SIP network and the traditional mobile network, for example.

In a UMA based femtocell deployment approach, a generic access network (GAN) may offer an alternative way to access GSM and GPRS core network services over broadband. To support this approach, a UMA Network Controller (UNC) and protocols that guarantee secure transport of signaling and user traffic over IP may be utilized. The UNC may be enabled to interface into a core network via existing 3GPP interfaces, for example, to support core network integration of femtocell based services by delivering a standards based, scalable IP interface for mobile core networks.

In an IMS VCC based femtocell deployment approach, VCC may provide for a network design that may extend an IMS network to include cellular coverage and address the handoff process. The IMS VCC may be designed to provide seamless call continuity between cellular networks and any network that supports VoIP, for example. The VCC may also provide for interoperability between GSM, UMTS, and CDMA cellular networks and any IP capable wireless access network, for example. The IMS VCC may also support the use of a single phone number or SIP identity and may offer a broad collection of functional advantages, for example, support for multiple markets and market segments, provisioning of enhanced IMS multimedia services, including greater service personalization and control, seamless handoff between circuit-switched and IMS networks, and/or access to services from any IP device.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method for timely delivery of multimedia content via a femtocell, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for timely delivery of multimedia content via a femtocell. In various embodiments of the invention, a femtocell may receive data via an upstream path and transmit data via a downstream path. One of the upstream path and downstream path may comprise a cellular path and the other may comprise a non-cellular path. One or both of the upstream path and the downstream path may be audio video bridging (AVB) paths. Data may be stored in the femtocell based on timing characteristics of one or both of the upstream path and the downstream path. Exemplary timing characteristics may comprise variation in delay between adjacent packets of a packet stream, and latency. Data may be delivered to the femtocell utilizing best effort delivery and the data may be forwarded by the femtocell with guaranteed quality of service. The femtocell may be operable to transcode received data to generate data for transmission. Cellular and/or non-cellular resources in the femtocell may be reserved, utilizing AVB protocols, for communication of one or more data streams over the non-cellular and/or cellular path. The femtocell may be synchronized with a cellular enabled communication device utilizing and/or with a non-cellular device utilizing AVB protocols. The femtocell may be operable to generate timestamps in accordance with AVB protocols.

Figure 1A:
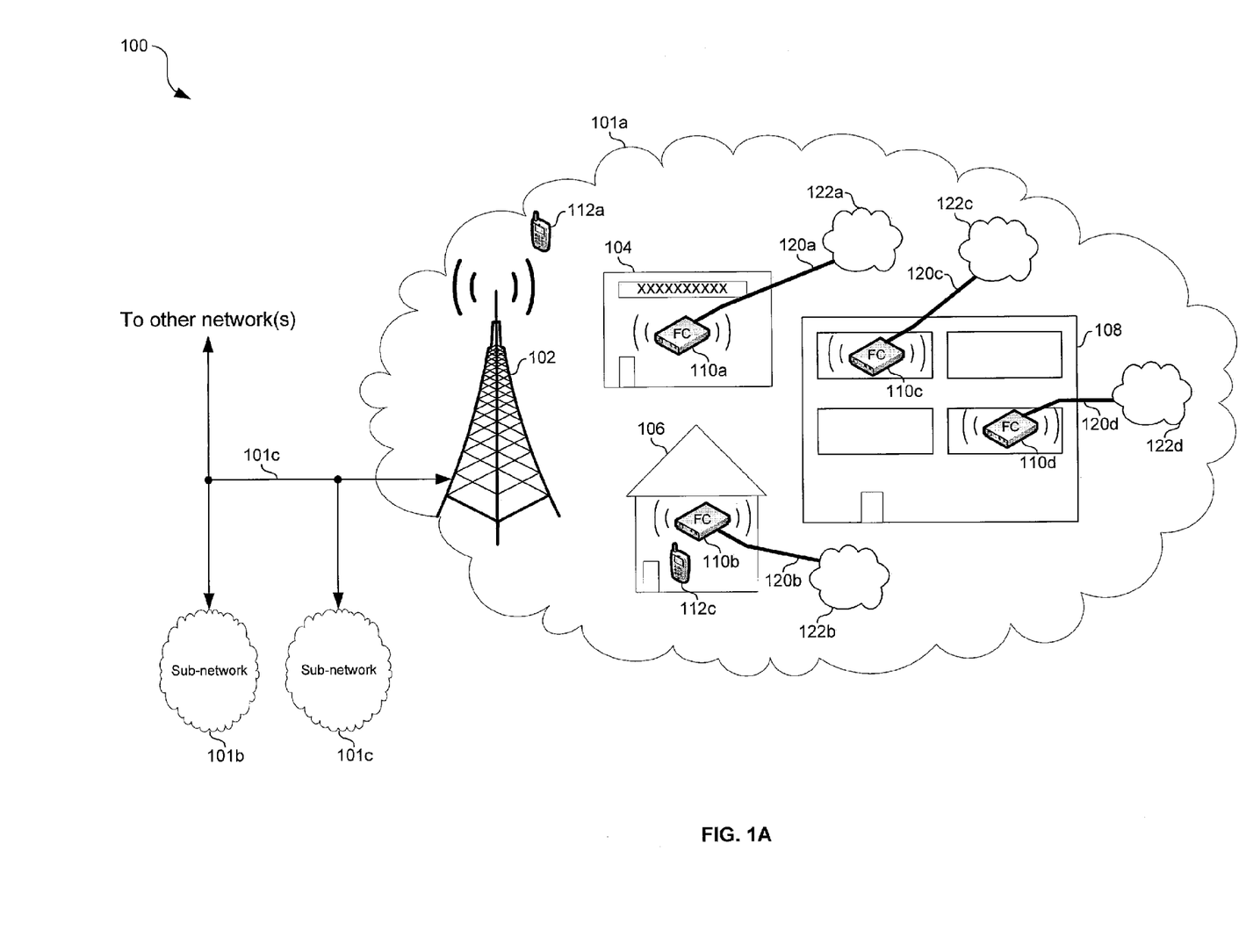
FIG. 1A is a diagram illustrating an exemplary cellular network, in accordance with an embodiment of the invention.

FIG. 1A is a diagram illustrating an exemplary cellular network, in accordance with an embodiment of the invention. Referring to FIG. 1A, there is shown a cellular network 100 comprising sub-networks 101a-101c. The exemplary sub-network 101a may comprise a base station 102, femtocells 110a-110d, which are collectively referred to herein as femtocells 110, and cellular enabled communication devices 112a and 112c, which are collectively referred to herein as cellular enabled communication devices 112. The femtocells 110 may be installed in one or more commercial properties 104, one or more residential properties 106, and/or one or more multi-tenant properties 108. The femtocells 110 may be communicatively coupled to one or more networks 122 which may, for example, couple the femtocells 110 to a backbone network.

The networks 122a-122d, collectively referred to herein as networks 122, may comprise, for example, satellite networks, cable networks, DVB networks, the Internet, or similar local or wide area networks, which are capable of conveying data which may comprise, for example, multimedia. The connections 120a-120d, collectively referred to herein as connections 120, may comprise optical, wired, and/or wireless links.

In various embodiments of the invention, one or more of the networks 122a-122d and/or the connections 120a-120d may support audio video bridging (AVB) protocols. Individual protocols associated with AVB comprise, among others, IEEE P802.1AS—IEEE Standard for Local and Metropolitan Area Networks—Timing and Synchronization for Time-Sensitive Applications in Bridged Local Area Networks, IEEE P802.1Qat—IEEE Standard for Local and Metropolitan Area Networks: Virtual Bridged Local Area Networks—Amendment 9: Stream Reservation Protocol (SRP), IEEE P802.1Qav: IEEE Standard for Local and Metropolitan Area Networks: Virtual Bridged Local Area Networks—Amendment 11: Forwarding and Queuing for Time-Sensitive Streams, and IEEE 802.1BA: IEEE Standard for Local and Metropolitan Area Networks—Audio Video Bridging (AVB) Systems.

The commercial properties 104 may comprise, for example, stores, restaurants, offices, and municipal buildings. The residential properties 106 may comprise, for example, single-family homes, home offices, and/or town-houses. Multi-tenant properties 108 may comprise residential and/or commercial tenants such as apartments, condos, hotels, and/or high rises.

The base station 102 may be operable to communicate data wirelessly utilizing one or more cellular standards such as IS-95, CDMA2000, GSM, UMTS, TD-SCDMA, extensions thereto, and/or variants thereof. "Data," as utilized herein, may refer to any analog and/or digital information including but not limited to voice, Internet data, and/or multimedia content. Multimedia content may comprise audio and/or visual content comprising, video, still images, animated images, and/or textual content. The base station 102 may communicate with cellular enabled communication devices such as the cellular enabled communication devices 112. Exemplary cellular standards supported by the base station 102 may be specified in the International Mobile Telecommunications-2000 (IMT-2000) standard and/or developed by the $3^{rd}$ generation partnership project (3GPP) and/or the $3^{rd}$ generation partnership project 2 (3GPP2). The base station 102 may communicate data amongst the various components of the sub-network 101a. Additionally, data communicated to and/or from the base station 102 may be communicated to sub-network 101b, sub-network 101c, and/or to one or more other networks (not shown) via one or more backhaul links 103. In this manner, data communicated to and/or from the base station 102 may be communicated to and/or from, other portions of the network 100 and/or other networks. Exemplary networks with which data may be communicated may comprise public switched telephone networks (PSTN) and/or IP networks such as the Internet or an intranet.

The cellular enabled communication devices 112 may each comprise suitable logic, circuitry, and/or code that may be operable to communicate utilizing one or more cellular standards. In this regard, the cellular enabled communication devices 112 may each be operable to transmit and/or receive data via the cellular network 100. Exemplary cellular enabled communication devices may comprise laptop computers, mobile phones, and personal media players. The cellular enabled communication devices 112 may be enabled to transmit, receive, process, and present multimedia content and may additionally be enabled run a network browser or other applications for providing Internet services to a user of the cellular enabled communication device 112. One or more of the cellular enabled communication devices 112 may be operable to utilize AVB protocols, or a subset thereof, for communicating over cellular links. In this regard, resources in a cellular enabled communication device 112 associated with cellular communications may be reserved for certain datastreams, resources in a cellular enabled communication devices 112 may be synchronized with one or more femtocells, and/or the cellular enabled communication devices 112 may be operable to guarantee processing and forwarding of received data within a specified amount of time.

The femtocells 110 may each comprise suitable logic, circuitry, interfaces, and/or code that may be operable to communicate wirelessly utilizing one or more cellular standards such as IS-95, CDMA2000, GSM, UMTS, TD-SCDMA, extensions thereto, and/or variants thereof. In this regard, the femtocells 110 may each communicate with cellular enabled communication devices such as the cellular enabled communication devices 112. Exemplary cellular standards supported by the femtocells 110 may be specified in the International Mobile Telecommunications-2000 (IMT-2000) standard and/or developed by the $3^{rd}$ generation partnership project (3GPP) and/or the $3^{rd}$ generation partnership project 2 (3GPP2). One or more of the femtocells 110 may be operable to utilize AVB protocols, or a subset thereof, for communicating over cellular links. In this regard, resources in a femtocell 110 associated with cellular communications may be reserved for certain datastreams, resources in a femtocell 110 may be synchronized with one or more cellular link partners, and/or the femtocell 110 may be operable to guarantee processing and forwarding of received data within a specified amount of time.

Additionally, the femtocells 110 may each comprise suitable logic, circuitry, and/or code that may be operable to communicate over an IP network (not shown in FIG. 1A). The femtocells 110 may each be communicatively coupled to a network 122 via a network link 120. The networks 122 may provide connectivity via, for example, proprietary networks, local area networks (LAN), and/or or the Internet. In various embodiments of the invention, the networks 122 may utilize transmission control protocol (TCP) and Internet protocol (IP). The network links 120 may each comprise wired and/or wireless links. Exemplary wired links may comprise fiber or twisted pair copper cabling operable to support, for example, Ethernet, USB, IEEE 1394, digital subscriber line (DSL), or a T1 line. Exemplary wireless links may comprise Wi-Fi, WiMax, wireless USB, ZigBee, and Bluetooth. One or more of the femtocells 110 may be operable to utilize AVB protocols, or a portion thereof, for communicating over non-cellular links. In this regard, resources in a femtocell 110 associated with non-cellular communications may be reserved for certain datastreams, resources in a femtocell 110 may be synchronized with one or more non-cellular link partners, and/or the femtocell 110 may be operable to guarantee processing and/or forwarding of received data within a specified amount of time.

In various embodiments of the invention, a femtocell 110 may be operable to recover or acquire information related to one or more non-AVB paths traversed by a packet stream. The non-AVB paths may comprise one or more cellular links and/or one or more non-cellular links. A femtocell 110 may characterize a non-AVB upstream path—a path via which a packet stream arrives at a femtocell 110 from a content source (such as the node 202 of FIG. 2A)—by monitoring and/or inspecting packets received via the upstream path. Similarly, a femtocell 110 may characterize a non-AVB downstream path—a path via which a femtocell communicates content to an end-device—by monitoring and/or inspecting acknowledgement and/or control packets received from a downstream device. The nomenclature downstream and upstream path as used herein refers the primary direction of data for a datastream, however, a path may be bidirectional or unidirectional.

In this regard, the femtocell 110 may be operable to determine, for example, the number and/or type of network hops and/or nodes which a packet stream traverses in arriving at the femtocell 110. In some instances, the non-AVB paths may still support a synchronization method such as IEEE 1588 and thus packet timestamps may be utilized to determine packet variable delay (also referred to as packet jitter) and/or latency.

In various embodiments of the invention, a femtocell 110 may be operable to recover or acquire information related to one or more AVB paths traversed by a packet stream. An AVB path may comprise two or more AVB enabled network nodes that are communicatively coupled via at least one network link. An AVB path may be bidirectional or unidirectional. The AVB nodes may be synchronized, the AVB nodes may be operable to store and forward packets within a guaranteed amount of time, and resources in each of AVB nodes may be reserved for one or more packet streams. In various embodiments of the invention, the AVB paths may comprise one or more cellular links and/or one or more non-cellular links and one or more cellular and/or non-cellular devices. A femtocell 110 may characterize an AVB path based on AVB packets received via the path, reservation packets or bridge protocol data units (BPDUs), and/or synchronization packets or BPDUs. For example, a class of service associated with an AVB stream and corresponding timing parameters defined in the AVB standards may be utilized to characterize a network path.

In operation, a packet stream comprising multimedia content may be transmitted from a content source (not shown in FIG. 1A) to a femtocell 110, e.g., femtocell 110b, via the network connection 120b. The femtocell 110b may buffer the received packet stream, process the packet stream, generate a corresponding packet stream, and/or transmit the corresponding packet stream to the cellular enabled communication device 112c. In order to ensure that the packets are delivered to the cellular enabled communication device 112c in a timely manner, the femtocell 110b may manage the size and/or thresholds of buffers utilized to buffer the packet stream, the corresponding packet stream, and/or the multimedia content recovered from the packet stream. In this regard, the femtocell 110b may characterize the upstream path, which comprises the link 120b, traversed by the packet stream en route to the femtocell 110b. Additionally and/or alternatively, the femtocell 110b may characterize the downstream path, which comprises a cellular link, traversed by the packet en route to the cellular enabled communication device 112c. Exemplary characteristics of a network path that may be determined are packet variable delay (referred to herein as packet jitter) and latency.

In some embodiments of the invention, actual variable packet delay and/or latency present in the packet stream may be determined. In some embodiments of the invention, maximum tolerable variable packet delay and/or latency for the packet stream may be determined. Accordingly, the femtocell 110b may optimize the buffer sizes and/or thresholds to optimize packet latency and variable packet delay such that the multimedia content may be received, processed, and presented in a timely manner in the cellular enabled communication device 112.

In various embodiments of the invention, the content source, one or more of the intermediate nodes along the path, and/or a femtocell 110 may modify packets such that information pertaining to the nodes and/or hops traversed by those packets may be determined by monitoring the arrival of and/or inspecting the contents of, the packets. Alternatively and/or additionally, a femtocell 110 may utilize one or more databases, or similar data structures, for determining timing characteristics of nodes and/or hops along an upstream and/or downstream path based on, for example, IP addresses of the nodes traversed. In this regard, the data structure may be stored within a femtocell 110 and/or may be stored in a network entity accessibly by a femtocell 110 via a corresponding network link 120.

In various embodiments of the invention, the path traversed by the packets may be established and characterized utilizing Audio Video Bridging (AVB) protocols. In this regard, resource reservation may establish a deterministic path from a content source to a femtocell. Accordingly, timing characteristics of a network path which may comprise one or more femtocells may be determined based on a level of service assigned to the packets, by information in the packets, and/or by bridge protocol data units (BPDU) or other information communicated in addition to the packets. With regard to information in the packets, the packets may comprise one or more fields defined or modified by one or more AVB protocols. For example, a packet may comprise one or more of a VLAN identifier field, a steam identifier filed, a class of service field, an Ethertype field, source address field, and a destination address field.

Thus, the femtocell 110*b* may utilize the path characterizations to manage capacity and/or thresholds of one or more buffers. The buffers may be managed based on whether an upstream path is an AVB path, whether a downstream path is an AVB path, and based on timing characteristics of the upstream and downstream paths.

Figure 1B:
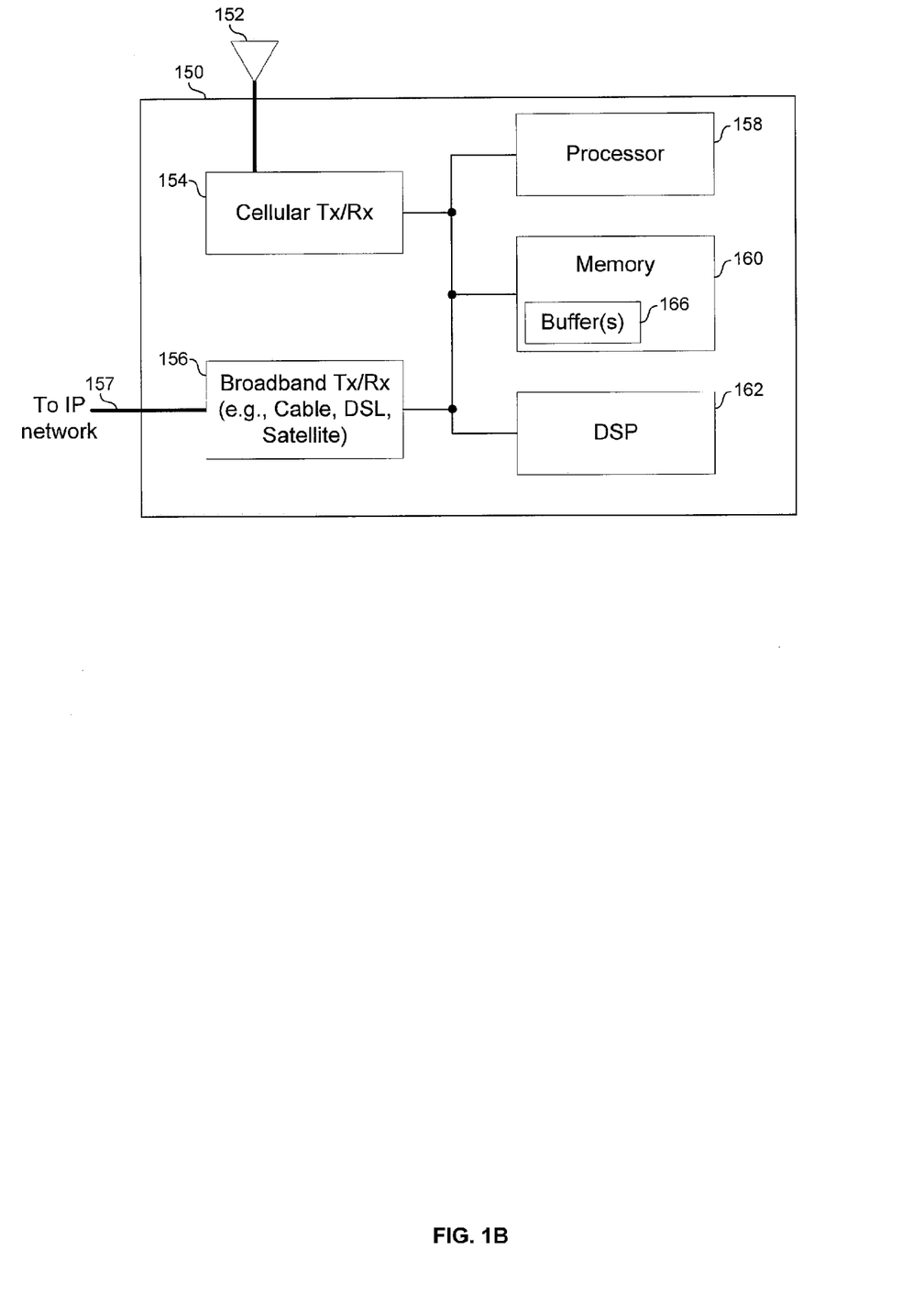
FIG. 1B is an exemplary block diagram of a femtocell, in accordance with an embodiment of the invention.

FIG. 1B is an exemplary block diagram of a femtocell, in accordance with an embodiment of the invention. Referring to FIG. 1B, there is shown a femtocell 150 comprising an antenna 152, a cellular transmitter and/or receiver (Tx/Rx) 154, a broadband transmitter and/or receiver (Tx/Rx) 156, a processor 158, a memory 160, a digital signal processor (DSP) 162, and a network connection 164. The femtocell 150 may be similar to or the same as the femtocells 110 described with respect to FIG. 1A.

The antenna 152 may be suitable for transmitting and/or receiving cellular signals. Although a single antenna is illustrated, the invention is not so limited. In this regard, the cellular Tx/Rx 154 may utilize a common antenna for transmission and reception, may utilize different antennas for transmission and reception, and/or may utilize a plurality of antennas for transmission and/or reception.

The cellular Tx/Rx 154 may comprise suitable logic circuitry and/or code that may be operable to transmit and/or receive voice and/or data utilizing one or more cellular standards. The cellular Tx/Rx 154 may be operable to perform amplification, down-conversion, filtering, demodulation, and analog to digital conversion of received cellular signals. The cellular Tx/Rx 154 may be operable to perform amplification, up-conversion, filtering, modulation, and digital to analog conversion of transmitted cellular signals. The cellular Tx/Rx 154 may support communication over a plurality of communication channels utilizing time division multiple access (TDMA) and/or code division multiple access (CDMA). Exemplary cellular standards supported by the femtocells 110 may be specified in the International Mobile Telecommunications-2000 (IMT-2000) standard and/or developed by the $3^{rd}$ generation partnership project (3GPP) and/or the $3^{rd}$ generation partnership project 2 (3GPP2). In various embodiments of the invention, the cellular Tx/Rx 154 may be operable to support AVB protocols, or a subset thereof. Additionally, an amount of time to receive and process ingress cellular packets, and/or an amount of time to process and transmit egress cellular packets, may be fixed, bounded by a maximum, and/or known in the femtocell 150. In such embodiments, it may be possible to guarantee quality of service between the femtocell 150 and a cellular enabled communication device.

The broadband Tx/Rx 156 may comprise suitable logic, circuitry, and/or code that may be operable to transmit voice and/or data in adherence to one or more broadband standards. The broadband Tx/Rx 156 may be operable to perform amplification, down-conversion, filtering, demodulation, and analog to digital conversion of received signals. The broadband Tx/Rx 156 may be operable to perform amplification, up-conversion, filtering, modulation, and digital to analog conversion of transmitted signals. In various exemplary embodiments of the invention, the broadband Tx/Rx 156 may transmit and/or receive voice and/or data over the link 157 which may be a T1/E1 line, passive optical network (PON), DSL, cable television infrastructure, satellite broadband internet connection, satellite television infrastructure, and/or Ethernet. In various embodiments of the invention, the cellular Tx/Rx 154 may be operable to support AVB protocols, or a subset thereof. Additionally, an amount of time to receive and process ingress cellular packets, and/or an amount of time to process and transmit egress cellular packets, may be fixed, bounded by a maximum, and/or known in the femtocell 150. In such embodiments, it may be possible to guarantee quality of service between the femtocell 150 and a non-cellular device.

The processor 158 may comprise suitable logic, circuitry, and/or code that may enable processing data and/or controlling operations of the femtocell 150. With regard to processing data, the processor 158 may enable packetization, de-packetization, transcoding, reformatting, and/or otherwise processing data received from and/or to be transmitted by the cellular Tx/Rx 154 and/or from the broadband Tx/Rx 156. In this regard, the processor 158 may be operable to packetize received packets and process the resulting packets to determine a path traversed by the packets en route from the packets' source to the femtocell 150. The received packets may be part of a packet stream and/or may be control and/or control packets. In some embodiments of the invention, the path information may be recovered or extracted, from the packets. In some embodiments of the invention, associated information, such as traversed IP addresses, may be recovered from the received packets and the associated information may be referenced to a database or similar data structure to determine the path information. In some embodiments of the invention, AVB may be utilized and a stream ID, class of service, or other AVB related information, may be recovered from the packets and utilized to determine path information.

With regard to controlling operations of the femtocell 150, the processor 158 may be enabled to provide control signals to the various other blocks comprising the femtocell 150. The processor 158 may also control data transfers between various portions of the femtocell 150. Additionally, the processor 158 may enable execution of applications programs and/or code. In various embodiments of the invention, the applications, programs, and/or code may enable, for example, parsing, transcoding, determining path information for received packets, or otherwise processing data. In various embodiments of the invention, the applications, programs, and/or code may enable, for example, configuring or controlling operation of the cellular Tx/Rx 154, the broadband Tx/Rx 156, the DSP 162, and/or the memory 160.

The memory 160 may comprise suitable logic, circuitry, and/or code that may enable storage or programming of information that includes parameters and/or code that may effectuate the operation of the femtocell 150. The parameters may comprise configuration data and the code may comprise operational code such as software and/or firmware, but the information need not be limited in this regard. Moreover, the parameters may include adaptive filter and/or block coefficients. Additionally, the memory 160 may comprise one or more buffers 166 for storing packets received via the cellular Tx/Rx 154 and/or the broadband Tx/Rx 156 and/or packets to be transmitted via the cellular Tx/Rx 154 and/or the broadband Tx/Rx 156. The capacity of the buffers 166 may be controlled via, for example, one or more control signals from the processor 158, the cellular Tx/Rx 154, the broadband Tx/Rx 156, and/or the DSP 162. Additionally, the buffers 166 may output one or more status signals to the processor 158, the cellular Tx/Rx 154, the broadband Tx/Rx 156, and/or the DSP 162. For example, "buffer almost full", "buffer full", "buffer almost empty", and "buffer empty" status signals may be utilized by the cellular Tx/Rx 154 the broadband Tx/Rx 156 to control a rate at which data is written to or read from the buffers 166. The thresholds for the status signals may be variable and controlled via one or more control signals from the processor 158, the cellular Tx/Rx 154, the broadband Tx/Rx 156, and/or the DSP 162. Thus, the memory 160 may enable packetization, de-packetization, transcoding, reformatting, and/or otherwise processing data received from and/or to be transmitted by the cellular Tx/Rx 154 and/or from the broadband Tx/Rx 156.

The DSP 162 may comprise suitable logic, circuitry, and/or code operable to perform computationally intensive processing of data. In various embodiments of the invention, the DSP 162 may encode, decode, modulate, demodulate, encrypt, decrypt, scramble, descramble, and/or otherwise process data. In various embodiments of the invention, the DSP 162 may be enabled to adjust a modulation scheme, error coding scheme, and/or data rates of transmitted cellular signals data.

In various embodiments of the invention, the femtocell 150 may support AVB protocols or a portion thereof. For example, the cellular Tx/Rx 154 and/or the broadband Tx/Rx 156 may be synchronized to other cellular or non-cellular, respectively, network devices utilizing IEEE 802.1AS or IEEE 1588. Also, resources, such as bandwidth in the cellular Tx/Rx 154 and/or broadband Tx/Rx 156, space in the memory 160, and/or time in the processor 158 and/or the DSP 162, may be reserved for one or more AVB streams. Additionally, buffering of received data and/or data-to-be-transmitted may be based on whether the upstream path and/or downstream path are AVB paths and based on determined characteristics of the upstream and downstream paths. In this regard, the femtocell 150 may be operable to manage transmit and/or receive buffers to guarantee a quality of service over AVB paths and provide best possible levels of service over non-AVB paths.

In operation, the femtocell 150 may receive a packet comprising multimedia content via the cellular Tx/Rx 154 or the broadband Tx/Rx 156. A timestamp may be generated corresponding to the arrival time of the packet. The received packet may be buffered in the memory 160. The processor 158 may parse and/or de-packetize the packet to recover the data contained therein. Additionally, the processor may inspect the contents of the packet to determine whether it is an AVB packet and/or to determine timing requirements of the packet. The packet inspection and the timestamp may be utilized to characterize the upstream path via which the packet was received and to manage the buffering of the packet for forwarding. Also, the processor 158, the memory 160, and/or the DSP 162 may transcode or otherwise process the received packet to generate a transcoded packet to be transmitted to a downstream node via the via the cellular Tx/Rx 154 or the broadband Tx/Rx 156. In this regard, a timestamp may be generated corresponding to a transmission time of the transcoded packet.

In various embodiments of the invention, the format of packets received from the cellular Tx/Rx 154 and/or from the broadband Tx/Rx 156 may depend on the standards and/or protocols in use. Accordingly, the femtocell 150 may be enabled to determine standards and/or protocols used in generating the packets such that the packets may be processed appropriately. Similarly, the format of packets to be transmitted by the cellular Tx/Rx 154 and/or from the broadband Tx/Rx 156 may vary depending on standards and/or protocols in use. Accordingly, the femtocell 150 may be enabled to packetize data according to one or more standards.

Figure 2A:
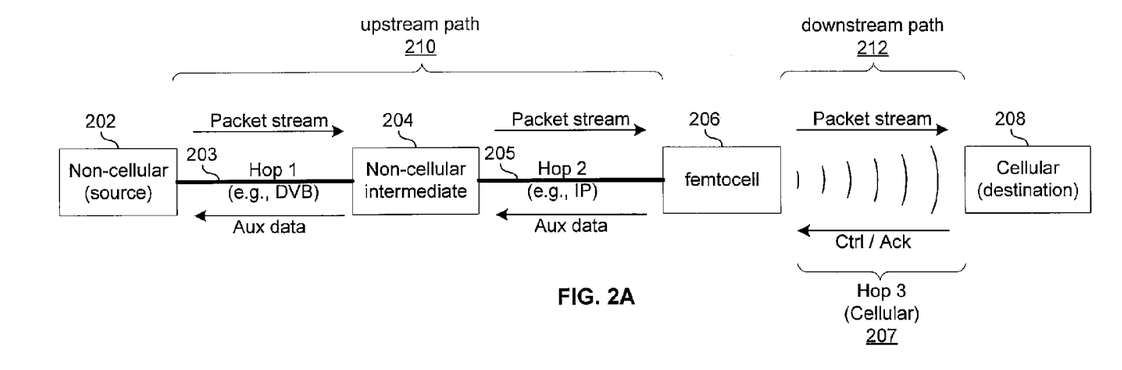
FIG. 2A is a diagram illustrating exemplary timely delivery of packetized multimedia content from a non-cellular network node to a cellular enabled communication device, in accordance with an embodiment of the invention.

FIG. 2A is a diagram illustrating exemplary timely delivery of packetized multimedia content from a non-cellular network node to a cellular enabled communication device, in accordance with an embodiment of the invention. Referring to FIG. 2A, there is shown an upstream path 210, and a downstream path 212. The upstream path 210 may comprise a non-cellular network node 202, a network link 203, a non-cellular node 204, a network link 205, and a femtocell 206. The downstream path 212 may comprise a cellular link 207 and a cellular enabled communication device 208.

The non-cellular network node 202 may comprise suitable logic, circuitry, and/or code that may be operable to generate encode, decode, compress, decompress, encrypt, decrypt, present, buffer, and/or otherwise process multimedia content. The non-cellular network node 202 may be operable to packetize the multimedia content and transmit the packet stream onto a network link. The non-cellular network node 202 may be operable to receive a packet stream and recover data from the packet stream. In various embodiments of the invention, the non-cellular network node 204 may be operable to utilize AVB. In various exemplary embodiments of the invention, the node 202 may be a content source operable to transmit content in adherence to, for example, DVB or other digital audio and/or video standards. Exemplary non-cellular devices comprise laptop computers, personal computers, and set-top boxes. In various exemplary embodiments of the invention, the node 202 may comprise a media display operable to receive and present content in adherence to, for example, DVB or other digital audio and/or video standards. Notwithstanding, the invention is not limited in the non-cellular communication standards and/or protocols utilized by the node 202.

The network links 203 and 205 may each comprise a wired, optical, or wireless communication link. The network link 203 may be a first hop on the path from the non-cellular node 202 to the cellular enabled communication device 208. The network link 205 may be a second hop on the path from the non-cellular node 202 to the cellular enabled communication device 208. In various embodiments of the invention, each of the links 203 and 205 may be a non-AVB link or may support at least a portion of AVB protocols.

The non-cellular network node 204 may comprise suitable logic, circuitry, and/or code operable to receive, process, and transmit packets comprising, for example, multimedia content. In various embodiments of the invention, the non-cellular network node 204 may be operable to utilize AVB. The non-cellular node 204 may be operable to communicate via one or more wired or wireless communication standards such as Ethernet, Wi-Fi, WiMax, USB, IEEE 1394, ZigBee, and/or Bluetooth. Notwithstanding, the invention is not limited in the non-cellular communication standards and/or protocols utilized by the node 204. In various exemplary embodiments of the invention, the node 204 may comprise a bridge, switch, router, and/or other networking device.

The femtocell 206 may be similar to or the same as the femtocells 110 and/or 150 described with respect to FIGS. 1A and 1B respectively.

The cellular link 207 may comprise one or more cellular communication channels between the femtocell 206 and the cellular enabled communication device. In this regard, the cellular link 207 may utilize one or more of the cellular communication standards described with respect to FIG. 1A.

The cellular enabled communication device 208 may be similar to or the same as the cellular enabled communication devices 112 described with respect to FIG. 1A.

In operation, the non-cellular node 202 may packetize multimedia content and may communicate the resulting packet stream onto the network link 203. The packet stream may subsequently arrive at the network node 204 which may forward the packets onto the link 205. The packet stream may subsequently arrive at the femtocell 206. The femtocell 206 may store the received packets in one or more buffers. In this regard, capacity and/or thresholds of the buffers may be managed based on timing characteristics of the upstream path 210 and/or downstream path 212. The femtocell 206 may communicate acknowledgment and/or other auxiliary packets to the node 204. In instances that the upstream path 210 is an AVB path, a stream ID and/or class of service may be utilized to characterize the upstream path 210 and timing requirements of the stream. In instances that the upstream path 210 is non-AVB, the femtocell 206 may inspect the received packets to characterize the upstream path 210 and timing requirements of the stream. In this regard, the determination may be made based, for example, on information inserted into the packet stream by the nodes 202 and/or 204. Jitter and/or latency information may be utilized to control capacity and/or thresholds of the one or more receive buffers utilized for storing the received packets in the femtocell 206.

The femtocell 206 may re-packetize the multimedia content recovered from the received packets into one or more corresponding packets suitable for transmission via the cellular link 207. In this regard, the femtocell 206 may, if necessary, transcode the packets from a format suitable for transmission over a non-cellular path to a format suitable for transmission over a cellular path. In generating the packet stream, the transcoded multimedia content and/or packets may be stored in one or more buffers. In this regard, capacity and/or thresholds of the buffers may be managed based on timing characteristics of the upstream path 210 and/or the downstream path 212. In this regard, the femtocell 206 may be operable to determine variable packet delay and/or latency introduced by the downstream path 212. In instances that the downstream path 212 is an AVB path, a stream ID and/or class of service may be utilized to characterize the downstream path 212. In instances that the downstream path 212 is non-AVB, the femtocell 206 may inspect acknowledgement and/or auxiliary packets received via the downstream path 212 to characterize the downstream path 212. In this regard, the determination may be made based, for example, on information inserted into the packet stream by the cellular enabled communication device 208. In various exemplary embodiments of the invention, the femtocell 206 may insert determined variable packet delay and/or latency information into the corresponding packets that may be utilized by downstream nodes.

The cellular enabled communication device 208 may receive the corresponding packet stream and may store the received packets in one or more buffers. Capacity and/or thresholds of the one or more buffers may be managed based on timing characteristics communicated to the cellular enabled communication device 208 and/or determined by the cellular enabled communication device 208. The buffered content may then be decoded, presented, and/or otherwise presented by the cellular enabled communication device 208.

In this manner, buffer management based on timing characteristics of a traversed network path may enable multimedia content communicated from a non-cellular node to a cellular enabled communication device via a femtocell to be decoded, presented, and/or otherwise processed in a timely manner. In this regard, the content may be presented with, for example, minimal interruptions, minimal degradation of audio or video, and/or a minimum number of dropped frames.

In an exemplary embodiment of the invention, the upstream path 210 may be a non-AVB path and the downstream path 212 may be an AVB path. Accordingly, data, such as multimedia content, from the node 202 may be queued on the femtocell 206 for a period of time and then the queued data may be delivered with guaranteed quality of service to the cellular enabled communication device via the downstream path 212. The amount of time the data is buffered by the femtocell 206 may depend, at least in part, on timing characteristics of the upstream path 210. In this manner, data may be downloaded, utilizing best effort delivery, from the node 202 to the femtocell 206, and subsequently delivered, with a guaranteed quality of service, from the femtocell 206 to the cellular enabled communication device 208.

Figure 2B:
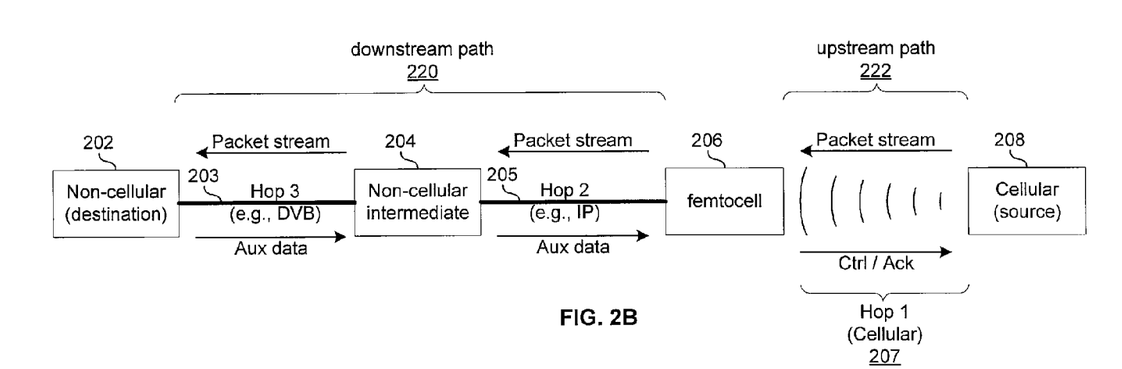
FIG. 2B is a diagram illustrating exemplary timely delivery of packetized multimedia content from a cellular enabled communication device to a non-cellular network node, in accordance with an embodiment of the invention.

FIG. 2B is a diagram illustrating exemplary timely delivery of packetized multimedia content from a cellular enabled communication device to a non-cellular network node, in accordance with an embodiment of the invention. Referring to FIG. 2B, there is shown an upstream path 222 comprising a cellular enabled communication device 208 and a cellular link 207, and a downstream path 220 comprising a network link 205, non-cellular node 204, a network link 203, and a non-cellular network node 202. In this regard, FIG. 2B depicts a packet stream being conveyed in the opposite direction of the packet stream of FIG. 2A.

The non-cellular network device 202, the network links 203 and 205, the non-cellular network node 204, the femtocell 206, the cellular link 207, and the cellular enabled communication device 208 may be as described with respect to FIG. 2A.

In operation, the cellular enabled communication device 208 may packetize multimedia content and may communicate the resulting packet stream onto the cellular link 207. In instances that the upstream path 222 is a non-AVB path, information to identify and/or characterize the cellular enabled communication device 208 and/or the link 207 may be inserted into the packets by the cellular enabled communication device 208. The inserted information may be utilized by downstream nodes to determine timing characteristics of the path traversed by the packet stream. In instances that the upstream path 222 is an AVB path, path characteristics and timing requirements of the packet stream may be determined based on, for example, stream ID, class of service, reservation packets or BPDUs exchanged to setup the upstream path 222, and/or synchronization packets or BPDUs exchanged to synchronize the cellular enabled communication device 208 to the femtocell 206.

The packet stream may subsequently arrive at the femtocell 206. The femtocell 206 may communicate acknowledgment and/or other auxiliary packets to the femtocell 206. The femtocell 206 may store the received packets in one or more receive buffers. The buffers may be managed based on characteristics of the upstream path 222 and timing requirements of the packet stream. In instances that the upstream path 222 is an AVB path, a stream ID and/or class of service may be utilized to characterize the upstream path 222. In instances that the upstream path 222 is non-AVB, the femtocell 206 may inspect the received packets to characterize the upstream path 210. In this regard, the determination may be made based, for example, on information inserted into the packet stream by cellular enabled communication device 208. In this manner, the femtocell 206 may be operable to determine variable packet delay and/or latency introduced by the cellular enabled communication device 208 and the link 207.

The femtocell 206 may re-packetize the multimedia content recovered from the received packets into one or more corresponding packets suitable for transmission via the link 205. In this regard, the femtocell 206 may, if necessary, transcode the packets from a format suitable for transmission over a non-cellular path to a format suitable for transmission over a cellular path. In generating the transcoded packet stream, the multimedia content and/or the generated packets may be stored in one or more transmit buffers. In this regard, capacity and/or thresholds of buffers may be managed based on timing characteristics of the downstream path 220. In instances that the downstream path 220 is an AVB path, a stream ID and/or class of service may be utilized to characterize the downstream path 220. In instances that the downstream path 220 is non-AVB, the femtocell 206 may inspect acknowledgement and/or auxiliary packets received via the downstream path 220 to characterize the downstream path 220. In this regard, the determination may be made based, for example, on information inserted into the packet stream by the cellular enabled communication device 208. In various exemplary embodiments of the invention, the femtocell 206 may insert determined variable packet delay and/or latency information, which may be utilized by downstream nodes, into the transcoded packets.

The corresponding packet stream may subsequently arrive at the network node 204 which may forward the packets onto the link 203. Additionally, the node 204 may communicate acknowledgment and/or other auxiliary packets to the femtocell 206. In various exemplary embodiments of the invention, information to identify and/or characterize the node 204 and/or the link 203 may be inserted into the packets by the node 204. The inserted information and/or AVB may be utilized by downstream nodes to determine timing characteristics of the downstream path.

The node 202 may receive the corresponding packet stream and may store the received packets in one or more buffers. Capacity and/or thresholds of the one or more buffers may be managed based on path characteristics communicated to the node 202 and/or determined by the node 202. The buffered content may then be decoded, presented, and/or otherwise presented by the cellular enabled communication device 208.

In this manner, buffer management based on timing characteristics of network paths may enable multimedia content communicated from a cellular enabled communication device to a non-cellular node via a femtocell to be decoded, presented, and/or otherwise processed in a timely manner. In this regard, the content may be presented with, for example, minimal interruptions, minimal degradation of audio or video, and/or a minimum number of dropped frames.

In an exemplary embodiment of the invention, the upstream path 222 may be a non-AVB path and the downstream path 220 may be an AVB path. Accordingly, data, such as multimedia content, from the cellular enabled communication device 208 may be queued on the femtocell 206 for a period of time and then the queued data may be delivered with guaranteed quality of service to the node 202 via the downstream path 220. The amount of time the data is buffered by the femtocell 206 may depend, at least in part, on timing characteristics of the upstream path 222. In this manner, data may be downloaded, utilizing best effort delivery, from the cellular enabled communication device 208 to the femtocell 206, and subsequently delivered, with a guaranteed quality of service, from the femtocell 206 to the node 202.

Figure 3:
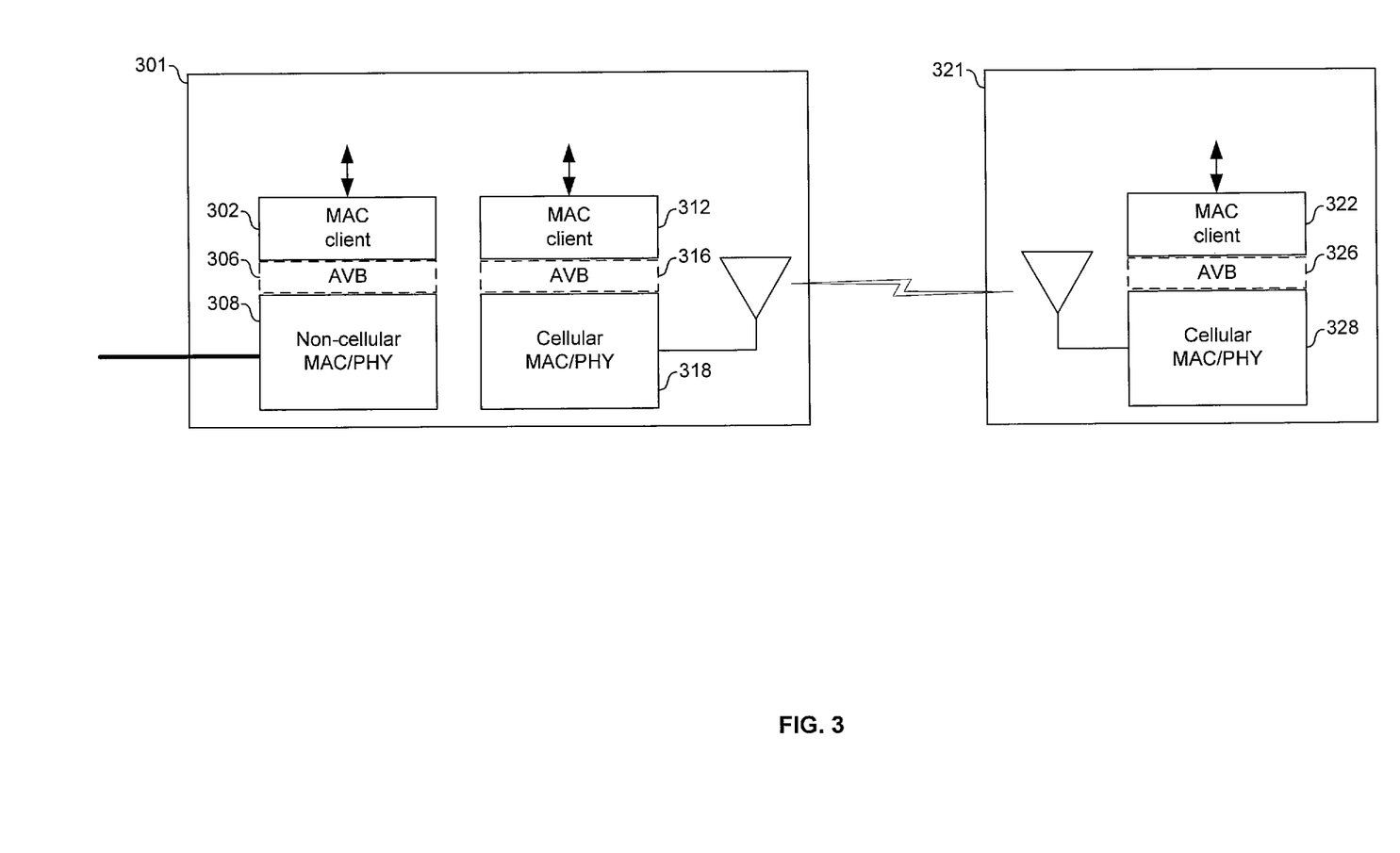
FIG. 3 is a diagram illustrating portions of an exemplary femtocell and cellular enabled communication device which may communicate utilizing AVB, in accordance with an embodiment of the invention.

FIG. 3 is a diagram illustrating portions of an exemplary femtocell and cellular enabled communication device which may communicate utilizing AVB, in accordance with an embodiment of the invention. Referring to FIG. 3, there is shown a portion 301 of a femtocell and portion 321 of a cellular enabled communication device. The portion 301 of the femtocell may comprise a non-cellular media access control (MAC) client 302, a cellular MAC client 312, an non-cellular AVB shim 306, a cellular AVB shim 316, a non-cellular MAC and physical layer transmitter and/or receiver (MAC/PHY) 308, and a cellular MAC/PHY 318. The portion 321 of the cellular enabled communication device may comprise a cellular MAC client 322, a cellular AVB shim 326, and a cellular MAC/PHY 328.

The non-cellular MAC client 302 may comprise suitable logic, circuitry, and/or code that may enable reception of data from another portion, such as a processor, of the femtocell, and may enable encapsulating the data in one or more non-cellular packets. Additionally, the non-cellular MAC client 302 may be enabled to receive non-cellular packets from the non-cellular MAC/PHY 308 and may enable decapsulation of the non-cellular packets to extract data which may comprise, for example, multimedia, auxiliary, control, or general Internet data. In this regard, non-cellular packets may be formatted and/or encapsulated according to one or more protocols. The non-cellular MAC client 302 may receive control signals and/or data from a processor, such as the processor 158. Additionally, the non-cellular MAC client 302 may store data to and/or read data from a memory, such as the memory 160. The non-cellular MAC client 302 may be implemented in one or more physical and/or functional blocks. In this regard, various functions implemented by the non-cellular MAC client 302 may be shared and/or separated physically and/or functionally.

The non-cellular AVB shim 306 may comprise suitable logic, circuitry and/or code that may enable timely transmission and/or reception of non-cellular packets. The non-cellular AVB shim 306 may append time synchronization information, such as a time stamp, to non-cellular packets. The non-cellular AVB shim 306 may append a time stamp when, for example, an Ethertype field indicates that an Ethernet frame is to utilize AV Bridging capabilities for transport across a network. The non-cellular AVB shim 306 may receive control signals and/or data from a processor, such as the processor 158. Additionally, the non-cellular AVB shim 306 may store data to and/or read data from a memory, such as the memory 160. The non-cellular AVB shim 306 may be implemented in one or more physical and/or functional blocks. In this regard, various functions implemented by the non-cellular AVB shim 306 may be shared and/or separated physically and/or functionally. In various embodiments of the invention, the non-cellular AVB shim 306 may or may not be present and/or may or not be enabled, as indicated by the dashed line. The AVB shim may not be enabled, for example, when the femtocell is communicatively coupled to a non-AVB enabled non-cellular network device.

The non-cellular MAC/PHY 308 may comprise suitable logic, circuitry, and or code that may enable providing addressing and/or access control to a network and may enable the transmission of non-cellular packets via a network. In this regard, the non-cellular MAC/PHY 308 may be enabled to buffer, prioritize, or otherwise coordinate the transmission and/or reception of data via an associated physical link. The non-cellular MAC/PHY 308 may be enabled to perform additional packetization, depacketization, encapsulation, and decapsulation of data. The non-cellular MAC/PHY 308 may enable generation of header information within the non-cellular packets, which enable the utilization of AVB within a network for transport of the non-cellular packets. The non-cellular MAC/PHY 308 may also enable traffic shaping and/or buffer management by determining time instants at which non-cellular packets may be transmitted onto a non-cellular link.

The cellular MAC clients 312 and 322 may comprise suitable logic, circuitry, and/or code that may enable reception of data from another portion, such as a processor, of the femtocell and cellular enabled communication device, respectively, and may enable encapsulating the data in one or more cellular packets. Additionally, the cellular MAC clients 312 and 322 may be enabled to receive cellular packets from the cellular MAC/PHYs 318 and 328, respectively, and may enable decapsulation of the cellular packets to extract data which may comprise, for example, multimedia, auxiliary, control, or general Internet data. In this regard, cellular packets may be formatted and/or encapsulated according to one or more protocols. The cellular MAC clients 312 and 322 may receive control signals and/or data from a processor, such as the processor 158. Additionally, the cellular MAC clients 312 and 322 may store data to and/or read data from a memory, such as the memory 160. The cellular MAC clients 312 and 322 may be implemented in one or more physical and/or functional blocks. In this regard, various functions implemented by the cellular MAC client 312 and 322 may be shared and/or separated physically and/or functionally.

The cellular AVB shims 316 and 326 may comprise suitable logic, circuitry and/or code that may enable timely transmission and/or reception of cellular packets. The cellular AVB shims 316 and 326 may append time synchronization information, such as a timestamp, to cellular packets. The cellular AVB shims 316 and 326 may, for example, append a time stamp when a packet header indicates that the packet is to utilize AV Bridging capabilities for transport across a cellular network. The cellular AVB shims 316 and 326 may receive control signals and/or data from a processor, such as the processor 158. Additionally, the cellular AVB shims 316 and 326 may store data to and/or read data from a memory, such as the memory 160. The cellular AVB shims 316 and 326 may be implemented in one or more physical and/or functional blocks. In this regard, various functions implemented by the cellular AVB shims 316 and 326 may be shared and/or separated physically and/or functionally. In various embodiments of the invention, the AVB shims 316 and 326 may or may not be present and/or may or not be enabled, as indicated by the dashed line. For example, one of the AVB shims 316 and 326 may not be enabled when the other is not present, in other words, when either the femtocell or the cellular enabled communication device does not support AVB over cellular.

The cellular media access controller and physical layer transceiver (MAC/PHY) 318 and 328 may comprise suitable logic, circuitry, and or code that may enable providing addressing and/or access control to a network and may enable the transmission of the cellular data via a network. In this regard, the cellular MAC/PHYs 318 and 328 may be enabled to buffer, prioritize, or otherwise coordinate the transmission and/or reception of data via an associated physical link. The cellular MAC/PHYs 318 and 328 may be enabled to perform additional packetization, depacketization, encapsulation, and decapsulation of data. The cellular MAC/PHYs 318 and 328 may enable generation of header information within the cellular packets, which enable the utilization of AVB within a network for transport of the cellular packets. The MAC/PHYs 318 and 328 may also enable traffic shaping and/or buffer management by determining time instants at which cellular packets may be transmitted onto a cellular link.

In operation, a non-cellular packet may be received via the non-cellular MAC/PHY 308 and communicated up through the non-cellular MAC/PHY 308 and non-cellular MAC client 302 to some higher layer functions and/or modules for transcoding. In instances that the AVB shim 306 is present and enabled, a timestamp may be generated upon the data being passed up to the AVB shim 306. The generated timestamp may be utilized to characterize the path and/or determining timing requirements of the data. In instances that the AVB shim 306 is not present and enabled, a path via which the packets were received may be characterized based on, for example, knowledge of the network topology stored in a data structure. Also, in instances, that the AVB shim 306 is not present and enabled, timing requirements of the packet may be characterized based on information communicated with the packet. Additionally, an amount of time for packets to pass up through the non-cellular MAC/PHY 308 may be fixed or known (within a tolerance) and may be utilized in conjunction with determined path characteristics and/or timing requirements to manage buffering, processing, and forwarding of received data.

The transcoded data may be communicated to the cellular MAC client 312 and may proceed down to the cellular MAC/PHY 318 for communication via a cellular link. In instances that the cellular link supports AVB, the AVB shim 316 may generate a timestamp as the data passes to the cellular MAC/PHY 318. The timestamp combined with a fixed or known delay through the MAC/PHY 318 may enable timely delivery of the data. Upon arriving at the cellular enabled communication device, the data may proceed up through the cellular MAC/PHY 328, cellular AVB shim 326, and cellular MAC client 324 in a similar manner as in the femtocell.

Communication in the other direction—from the cellular enabled communication device to the femtocell—may proceed in a similar manner.

Figure 4:
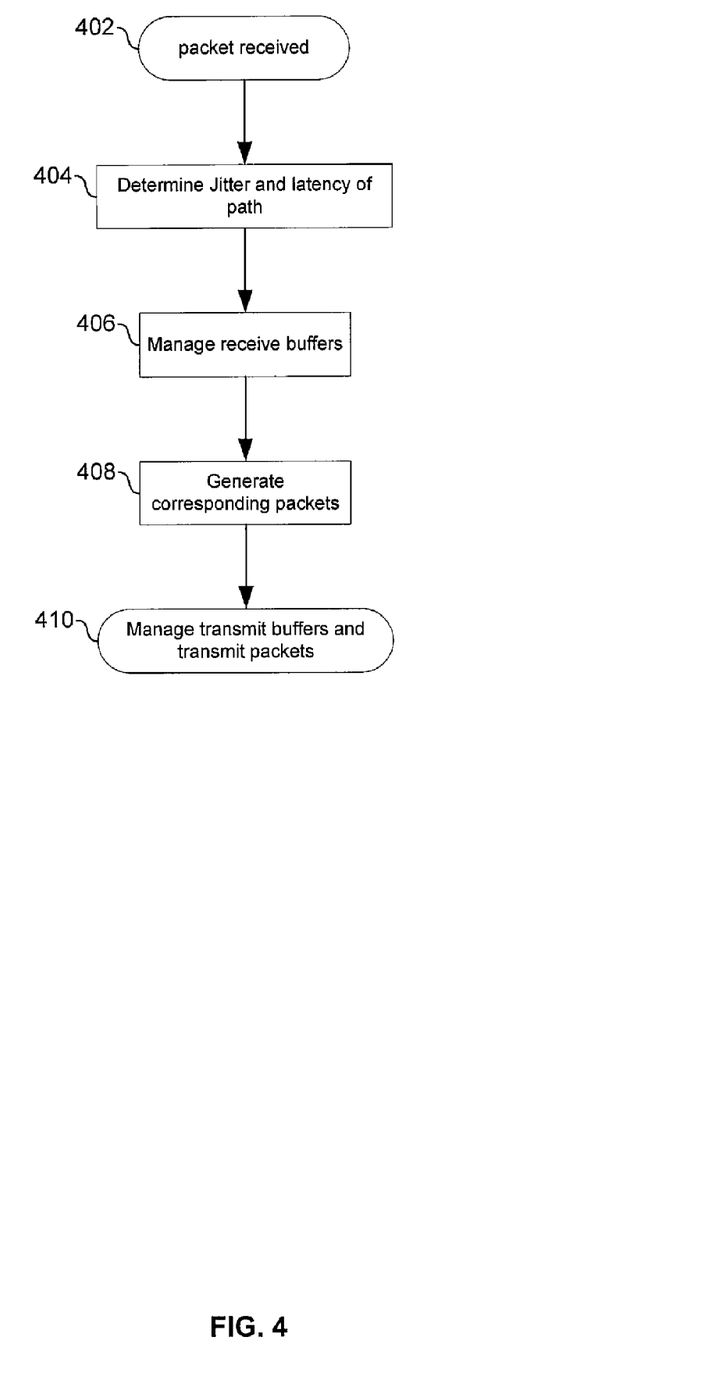
FIG. 4 is a flow chart illustrating exemplary steps for managing buffers in a femtocell to enable timely delivery of packetized multimedia content, in accordance with an embodiment of the invention.

FIG. 4 is a flow chart illustrating exemplary steps for managing buffers in a femtocell to enable timely delivery of packetized multimedia content, in accordance with an embodiment of the invention. Referring to FIG. 4, the exemplary steps may begin with step 302 when a femtocell receives a packet that is part of a packetized multimedia stream. In various embodiments of the invention, the received packet may be stored in one or more receive buffers prior to or during processing by the femtocell. Subsequent to step 402, the exemplary steps may advance to step 404.

In step 404, the femtocell may parse or otherwise process the received packet to recover the multimedia content contained therein. Additionally, the femtocell may determine information about the nodes and/or hops traversed by the packet. The determined path information may be utilized to determine timing characteristics such as variable packet delay and/or latency. Subsequent to step 404, the exemplary steps may advance to step 406.

In step 406, a capacity and/or one or more thresholds of the receive buffers may be adjusted based on the information determined in step 404. Subsequent to step 406, the exemplary steps may advance to step 408.

In step 408, the femtocell may generate one or more corresponding packets comprising the received multimedia content. In some embodiments of the invention, the femtocell may insert the determined path information and/or the determined timing characteristics. In other embodiments of the invention, the determined path information may be communicated separately from the corresponding packet(s). Subsequent to step 408, the exemplary steps may advance to step 410.

In step 410, the generated corresponding packets may be stored in one or more transmit buffers and transmitted from the buffer(s) onto a network link. In this regard, capacity and/or one or more thresholds of the transmit buffers may be managed based on determined characteristics of a path via which the corresponding packets are to be transmitted.

Aspects of a method and system for timely delivery of multimedia content via a femtocell are provided. In an exemplary embodiment of the invention, a femtocell 206 may receive data via an upstream path 210 and transmit data via a downstream path 212. One of the upstream path 210 and downstream path 212 may comprise a cellular path and the other may comprise a non-cellular path. One or both of the upstream path 210 and the downstream path 212 may be audio video bridging (AVB) paths. Data may be stored in the femtocell 206 based on timing characteristics of one or both of the upstream path 210 and the downstream path 212. Exemplary timing characteristics may comprise variation in delay between adjacent packets of a packet stream, and latency. Data may be delivered to the femtocell 206 utilizing best effort delivery and the data may be forwarded by the femtocell 206 with guaranteed quality of service. The femtocell 206 may be operable to transcode received data to generate data for transmission. Portions of the cellular Tx/Rx 154, the processor 158, the memory 160, and the DSP 162 (FIG. 1B), may be reserved for communication of one or more packet streams over the cellular path. Portions of the broadband Tx/Rx 156, the processor 158, the memory 160, and the DSP 162 (FIG. 1B), may be reserved for communication of one or more packet streams over the non-cellular path. The resources may be reserved utilizing AVB protocols. The femtocell 206 may be synchronized with a cellular enabled communication device 208 and/or with a non-cellular device 202 utilizing AVB protocols. The femtocell 206 may be operable to generate timestamps in accordance with AVB protocols.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for timely delivery of multimedia content via a femtocell.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communications, comprising:
receiving data in a femtocell via an upstream path; and
transmitting said data by said femtocell via a downstream path, wherein:
one of said upstream path and said downstream path comprises a cellular path to a cellular enabled communication device;
one of said upstream path and said downstream path comprises a non-cellular path to a non-cellular device; and
one or both of said upstream path and said downstream paths are audio video bridging (AVB) paths established utilizing one or both of IEEE 802.1 AVB protocols and extensions to said IEEE 802.1 AVB protocols, wherein said data is communicated to said femtocell utilizing best effort delivery and said data is transmitted by said femtocell with a guaranteed quality of service.

2. The method according to claim 1, further comprising transcoding said received data in said femtocell to generate said transmitted data.

3. A method for communications, comprising:
receiving data in a femtocell via an upstream path;
transmitting data by said femtocell via a downstream path, wherein:
one of said upstream path and said downstream path comprises a cellular path to a cellular enabled communication device;
one of said upstream path and said downstream path comprises a non-cellular path to a non-cellular device;
one or both of said upstream path and said downstream paths are audio video bridging (AVB) paths established utilizing IEEE 802.1 AVB protocols, and/or extensions to said IEEE 802.1 AVB protocols; and
reserving, utilizing one or both of IEEE 802.1 AVB protocols and extensions to said IEEE 802.1 AVB protocols, one or both of non-cellular resources and cellular resources in said femtocell and in said cellular enabled communication device for communication of one or more data streams over said cellular path.

4. The method according to claim 3, further comprising synchronizing said femtocell and said cellular enabled communication device utilizing one or both of said IEEE 802.1 AVB protocols and said extensions to said IEEE 802.1 AVB protocols.

5. The method according to claim 3, further comprising synchronizing said femtocell and said non-cellular device utilizing one or both of said IEEE 802.1 AVB protocols and said extensions to said IEEE 802.1 AVB protocols.

6. The method according to claim 3, further comprising generating timestamps in said femtocell in accordance with one or both of said IEEE 802.1 AVB protocols and said extensions to said IEEE 802.1 AVB protocols.

7. A system for communications, comprising:
one or more circuits for use in a femtocell, said one or more circuits being operable to:
receive data via an upstream path; and
transmit said data via a downstream path, wherein:
one of said upstream path and said downstream path comprises a cellular path to a cellular enabled communication device;
one of said upstream path and said downstream path comprises a non-cellular path to a non-cellular device; and
one or both of said upstream path and said downstream paths are audio video bridging (AVB) paths established utilizing one or both of IEEE 802.1 AVB protocols and extensions to said IEEE 802.1 AVB protocols, wherein said data is communicated to said femtocell utilizing best effort delivery, and said data is transmitted by said femtocell with a guaranteed quality of service.

8. The system according to claim 7, wherein said one or more circuits are operable to transcode said received data to generate said transmitted data.

9. A system for communications, comprising:
one or more circuits for use in a femtocell, said one or more circuits being operable to:
receive data via an upstream path;
transmit data via a downstream path, wherein:
one of said upstream path and said downstream path comprises a cellular path to a cellular enabled communication device;
one of said upstream path and said downstream path comprises a non-cellular path to a non-cellular device; and
one or both of said upstream path and said downstream paths are audio video bridging (AVB) paths established utilizing one or both of IEEE 802.1 AVB protocols and extensions to said IEEE 802.1 AVB protocols; and
reserve, utilizing one or both of IEEE 802.1 AVB protocols and extensions to said IEEE 802.1 AVB protocols, one or both of non-cellular resources and cellular resources in said femtocell and in said cellular enabled communication device for communication of one or more data streams over said cellular path.

10. The system according to claim 9, wherein said one or more circuits enable synchronization, utilizing one or both of said IEEE 802.1 AVB protocols and said extensions to said IEEE 802.1 AVB protocols, of said femtocell and said cellular enabled communication device.

11. The system according to claim 9, wherein said one or more circuits enable synchronization, utilizing one or both of said IEEE 802.1 AVB protocols and said extensions to said IEEE 802.1 AVB protocols, of said femtocell and said non-cellular device.

12. The system according to claim 9, wherein said one or more circuits are operable to generate timestamps in accordance with said IEEE 802.1 AVB protocols and said extensions to said IEEE 802.1 AVB protocols.

13. A method for communications, comprising:
receiving data in a femtocell via an upstream path;
transmitting data by said femtocell via a downstream path; and
adjusting characteristics of one or more buffers in said femtocell based on timing characteristics of one or both of said upstream path and said downstream path, wherein:
one of said upstream path and said downstream path comprises a cellular path to a cellular enabled communication device;
one of said upstream path and said downstream path comprises a non-cellular path to a non-cellular device;
one or both of said upstream path and said downstream paths are audio video bridging (AVB) paths established utilizing one or both of IEEE 802.1 AVB protocols and extensions to said IEEE 802.1 AVB protocols;
said timing characteristics of said upstream path comprise one or both of variation in delay between adjacent packets communicated via said upstream path and a latency of one or more packets communicated via said upstream path; and
said timing characteristics of said downstream path comprise one or both of variation in delay between adjacent packets communicated via said upstream path and a latency of one or more packets communicated via said upstream path.

14. A system for communications, comprising:
one or more circuits for use in a femtocell, said one or more circuits being operable to:
receive data via an upstream path;
transmit data via a downstream path; and
adjust characteristics of one or more buffers in said femtocell based on timing characteristics of one or both of said upstream path and said downstream path, wherein:
one of said upstream path and said downstream path comprises a cellular path to a cellular enabled communication device;
one of said upstream path and said downstream path comprises a non-cellular path to a non-cellular device;
one or both of said upstream path and said downstream paths are audio video bridging (AVB) paths established utilizing one or both of IEEE 802.1 AVB protocols and extensions to said IEEE 802.1 AVB protocols;
said timing characteristics of said upstream path comprise one or both of variation in delay between adjacent packets communicated via said upstream path and a latency of one or more packets communicated via said upstream path; and
said timing characteristics of said downstream path comprise one or both of variation in delay between adjacent packets communicated via said upstream path and a latency of one or more packets communicated via said upstream path.

* * * * *